United States Patent
Morimura et al.

[11] Patent Number: 5,438,695
[45] Date of Patent: Aug. 1, 1995

[54] RADIO-LINK CONTINUITY KEEPING EQUIPMENT IN CELLULAR TELEPHONE MOBILE STATION

[75] Inventors: Kazuo Morimura; Yuichi Fujii, both of Yokohama, Japan

[73] Assignee: Matsushita Electric Industrial Co., Ltd., Osaka, Japan

[21] Appl. No.: 62,724

[22] Filed: May 18, 1993

Related U.S. Application Data

[63] Continuation of Ser. No. 631,146, Dec. 29, 1990, abandoned.

[30] Foreign Application Priority Data

Dec. 28, 1989 [JP] Japan .................................. 1-342640

[51] Int. Cl.⁶ .............................................. H04B 1/16
[52] U.S. Cl. .................... 455/343; 455/38.3; 455/89; 455/127
[58] Field of Search ............ 455/33.1, 54.1, 56.1, 455/38.2, 38.3, 89, 127, 343; 379/57, 58, 61, 59

[56] References Cited
U.S. PATENT DOCUMENTS 5,036,532 12/1990 Metroka et al. .................... 455/127

Primary Examiner—Reinhard J. Eisenzopf
Assistant Examiner—Chi H. Pham
Attorney, Agent, or Firm—Stevens, Davis, Miller & Mosher

[57] ABSTRACT

A radio-link continuity keeping equipment in a cellular telephone mobile station includes a removable battery, a backup memory for storing therein a channel connection information when the battery is removed during a conversation mode, a timer for measuring an elapsed time after the battery is removed during the conversation mode until the battery is again set, and a device for judging whether or not the elapsed time measured by the timer is within a predetermined time and when the elapsed time is within the predetermined time, for restoring voice channel on the basis of the channel connection information stored in the backup memory. The timer is provided for measuring a time during which a battery is detached, i.e., the elapsed time after the battery is detached until a new battery is again set. When the measured time of the timer is shorter than the predetermined time, a voice channel is restored on the basis of the channel connection information stored in the backup memory. As a result, when the user exchanges the old battery with a new one in the predetermined time, a radio-link continuity can easily be kept.

4 Claims, 5 Drawing Sheets

RADIO-LINK CONTINUITY KEEPING EQUIPMENT IN CELLULAR TELEPHONE MOBILE STATION

This application is a continuation of application Ser. No. 07/631,146, filed Dec. 20, 1990 (abandoned).

BACKGROUND OF THE INVENTION

1. Field of the Invention

The present invention relates to a radio-link continuity keeping equipment which is used in a cellular telephone mobile station to keep a radio-link continuity when a power supply battery is exchanged during conversation on the telephone.

2. Description of the Related Art

FIG. 4 shows an arrangement of a prior art cellular telephone mobile station which keeps a radio-link with use of an electronic power supply switch when a battery is exchanged during conversation through the telephone. FIG. 5 shows a flowchart for explaining the operation of the radio-link keeping equipment.

In FIG. 4, a main CPU (central processing unit) 1 performs general control over the mobile station, and a secondary CPU 2 controls a display 21, a key-input unit 22 and an electronic power supply switch 35 and so on. More specifically, the main CPU 1 controls an RF (radio-frequency) transmitter, an RF receiver, the secondary CPU 2, a channel supervisory signal receive/send circuit 11, channel selector 12, an RF transmitter operation switch 13, a transmission output control circuit 14, an ear receiver switch 15 for turning ON and OFF a voice signal from the RF receiver to an ear receiver 17, a microphone switch 16 for turning ON and OFF a voice signal from a microphone 18 to the RF transmitter, a nonvolatile backup memory 31 for storing therein channel connection information, and so on.

A detachable power supply battery 3 supplies power through its battery contacts 39 to the main and secondary CPUs 1 and 2 and also to the RF receiver and transmitter. More in detail, the power supply from the power supply battery 3 to the main CPU 1 is carried out under the control of a power state signal 33 issued from the secondary CPU 2 to the main CPU 1.

That is, when the power supply battery 3 is connected for the first time, the secondary CPU 2 turns OFF the power state signal 33 and gets ready for an input from the electronic power supply switch 35. The main CPU 1 is not supplied with power from the power supply battery 3 under the control of the power state signal 33 and therefore circuits of the cellular telephone mobile station to be controlled by the main CPU 1 are all put in their OFF state.

When the electronic power supply switch 35 is now turned ON, this causes the secondary CPU 2 to turn ON the power state signal 33, whereby the main CPU 1 is activated so that a control information signal 23 issued from the main CPU 1 causes the secondary CPU 2 to be activated.

Thus, the cellular telephone mobile station is put in its idle mode so that, when originating a call or receiving a call, the mobile station is put in its conversation mode, during which, even when the power supply battery 3 is exchanged, the mobile station can keep a radio-link, which will be detailed later.

Next, the radio-link continuity keeping operation when the power supply battery 3 is exchanged in the conversation mode will be explained by referring to FIGS. 4 and 5.

In FIG. 5, the main and secondary CPUs 1 and 2 are both in their operational mode in the conversation mode (step 41). The main CPU 1, when receiving a channel information, operates the RF receiver, RF transmitter, channel supervisory signal receive/send circuit 11, channel selector 12, RF transmitter operation switch 13, transmission output control circuit 14, ear receiver switch 15 and microphone switch 16 (step 42).

At this time, if the power supply battery 3 is exhausted, a low voltage alarm is issued (step 43) and the power supply battery 3 is detached from the telephone set (step 44), then this causes the main CPU 1 to stop its operation with the channel information being stored in the backup memory 31, which results in that the secondary CPU 2 similarly stops its operation (step 45).

When a new power supply battery 3 is set (step 46) in place of the old one, as in the aforementioned initial mode, the secondary CPU 2 turns OFF the power state signal 33 to be sent to the main CPU 1 and gets ready for an input from the electronic power supply switch 35, whereas the main CPU 1 is not supplied with power from the power supply battery 3 under the control of the turned-OFF power state signal 33 (steps 47 and 48).

When the electronic power supply switch 35 is turned ON (step 49), the secondary CPU 2 turns ON the power state signal 33 to activate the main CPU 1 (step 50), so that the main CPU 1 outputs the control information signal 23 to start the secondary CPU 2 (step 51). Subsequently, the main CPU 1 turns ON only the RF receiver and turns OFF the RF transmitter, channel supervisory signal receive/send circuit 11, channel selector 12, RF transmitter operation switch 13, transmission output control circuit 14, ear receiver switch 15 and microphone switch 16 to abort the voice channel (step 52), which results in that the mobile station is put in the idle mode (step 53).

In the present example, there is provided a timer which measures an elapsed time after the power supply battery 3 is removed to turn OFF the main CPU until the electronic power supply switch 35 is turned ON to restart the main CPU 1, that is, which measures a time during which the main CPU 1 is not supplied with power. Therefore, when the measured elapsed time is shorter than a predetermined value, the channel can be restored on the basis of the channel information stored in the backup memory 31.

However, such prior art cellular telephone mobile station as mentioned above has had a problem that, in order to exchange a battery during telephone conversation, without losing the radio-link, the electronic power supply switch 35 should be turned ON in a predetermined time period after removal of the old power supply battery and insertion of a new one.

SUMMARY OF THE INVENTION

It is an object of the present invention to provide a cellular telephone mobile station which can solve the above problem in the prior art and can keep a radio-link through simple operation when it is desired to exchange a battery during telephone conversation.

In accordance with an aspect of the present invention, the above object is attained by providing a timer for measuring a time during which a battery is detached. More in detail, the timer measures the elaspsed time after the battery is detached until a new battery is again set. When the measured time of the timer is shorter than a predetermined time, a voice channel is restored on the basis of a channel connection information stored in a backup memory.

With such an arrangement of the present invention, when a user exchanges an old battery with a new one in the predetermined time, the channel being used for conversation can be restored immediately.

As mentioned above, the present invention is arranged so that the timer is provided for measuring a time during which a battery is detached, i.e., the elapsed time after the battery is detached until a new battery is again set, and so that, when the measured time of the timer is shorter than the predetermined time, a voice channel is restored on the basis of the channel connection information stored in the backup memory. As a result, when the user exchanges the old battery with a new one in the predetermined time, the channel being used for the conversation can be restored immediately.

DESCRIPTION OF THE PREFERRED EMBODIMENTS

Figure 1:
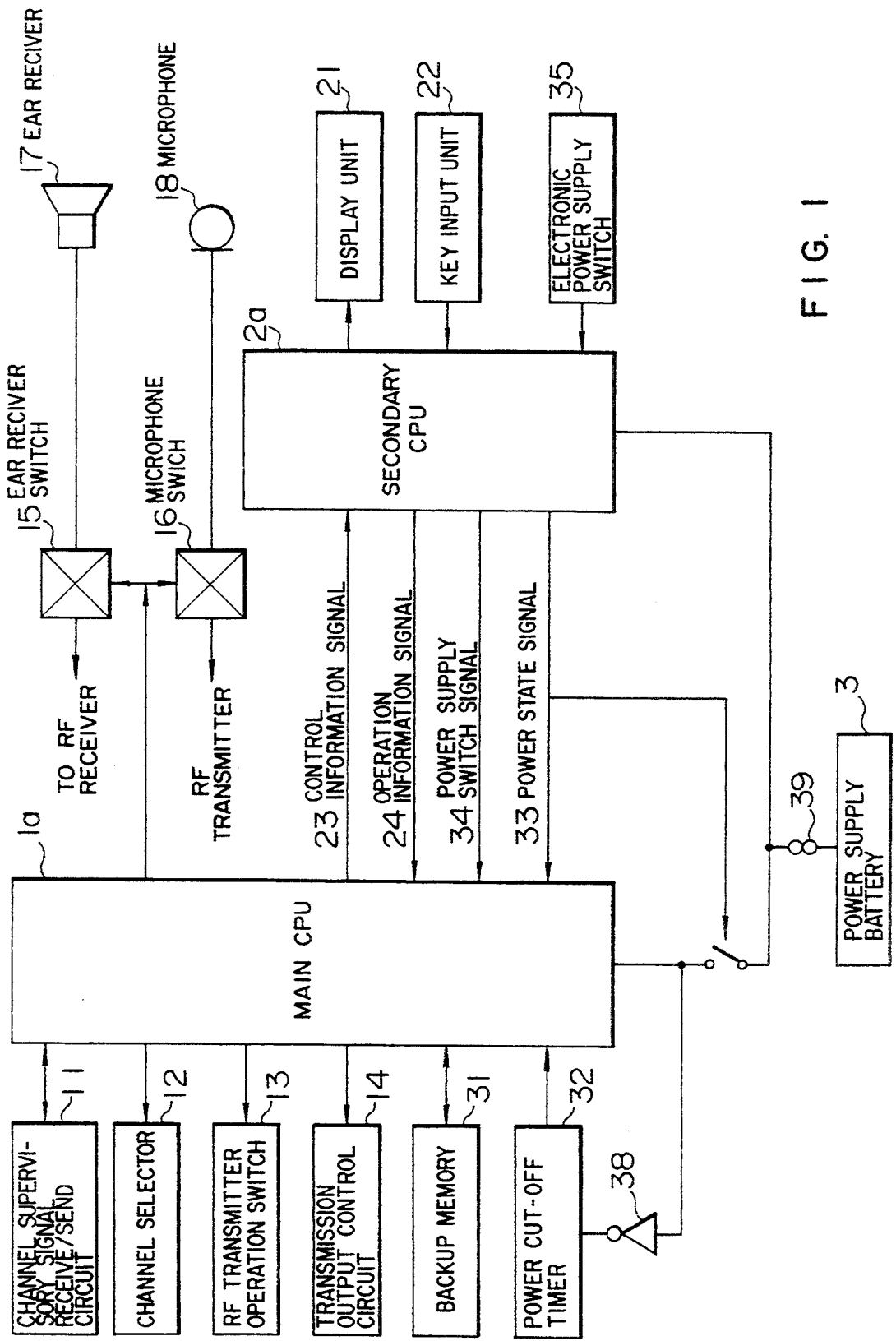
FIG. 1 is a block diagram of an embodiment of a cellular telephone mobile station based on a radio-link continuity keeping equipment of the present invention.
Figure 2:
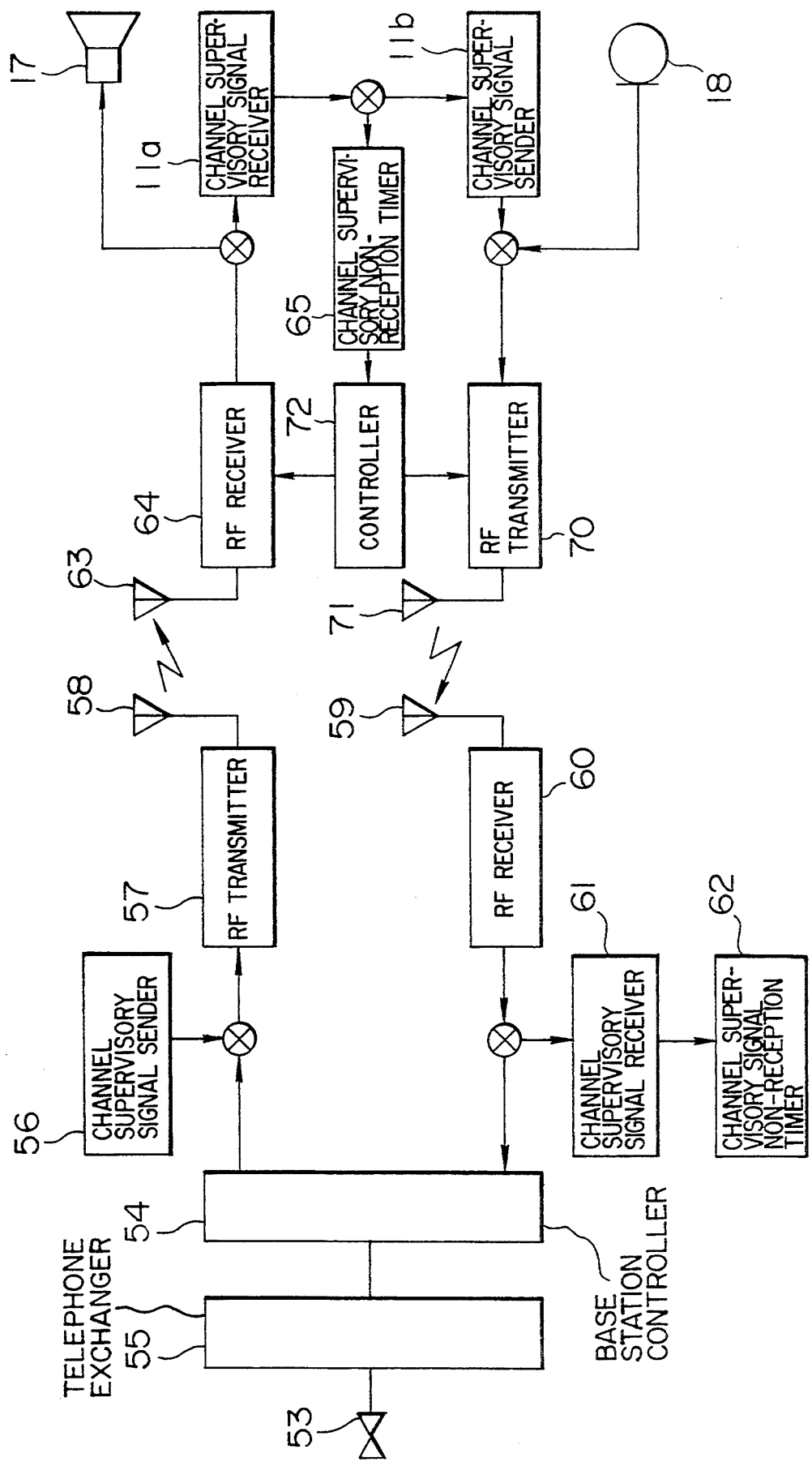
FIG. 2 is a block diagram of a cellular telephone system including the cellular telephone mobile station of FIG. 1.
Figure 3:
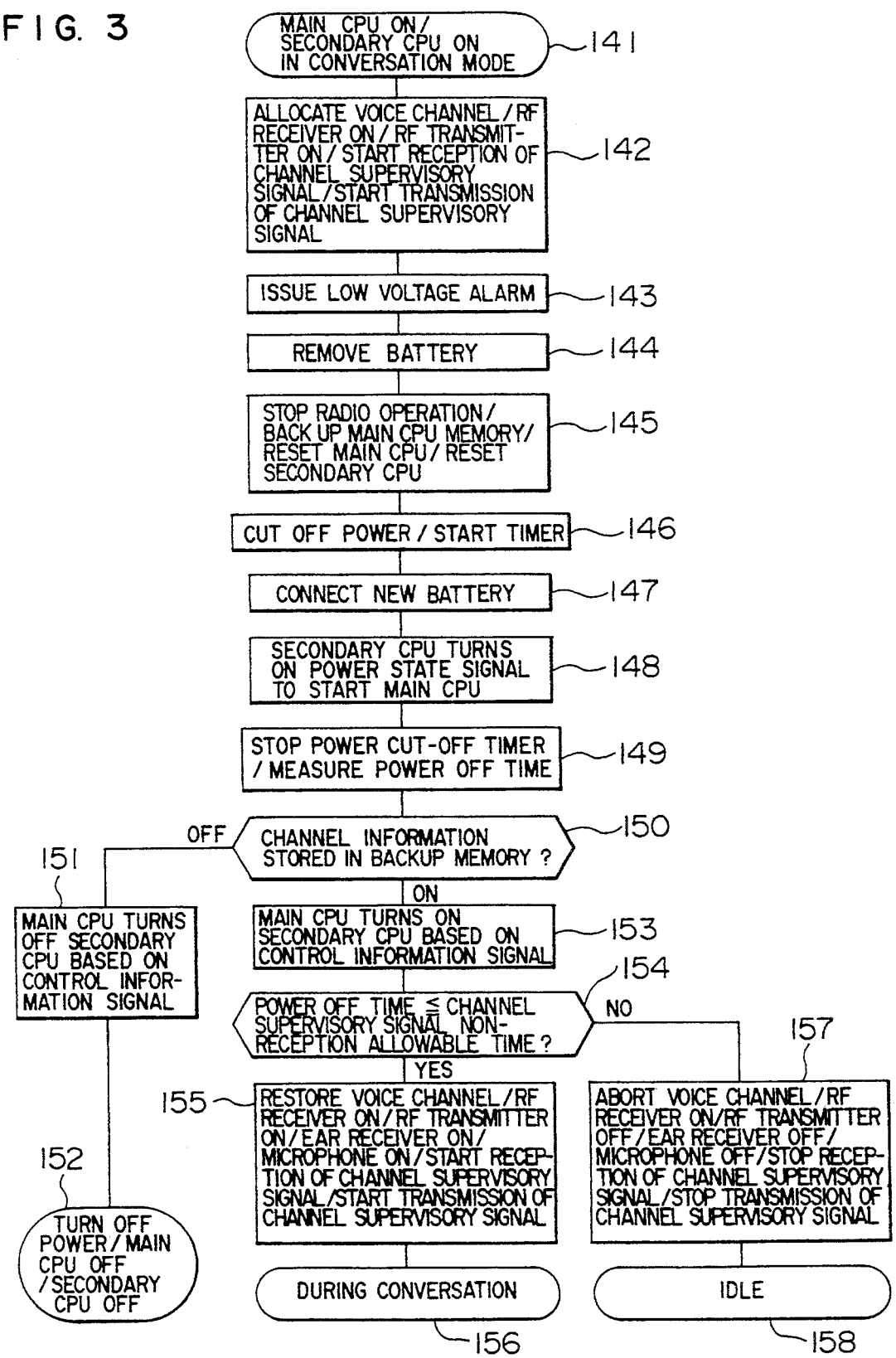
FIG. 3 is a flowchart for explaining the operation of the cellular telephone mobile station of FIG. 1.
Figure 4:
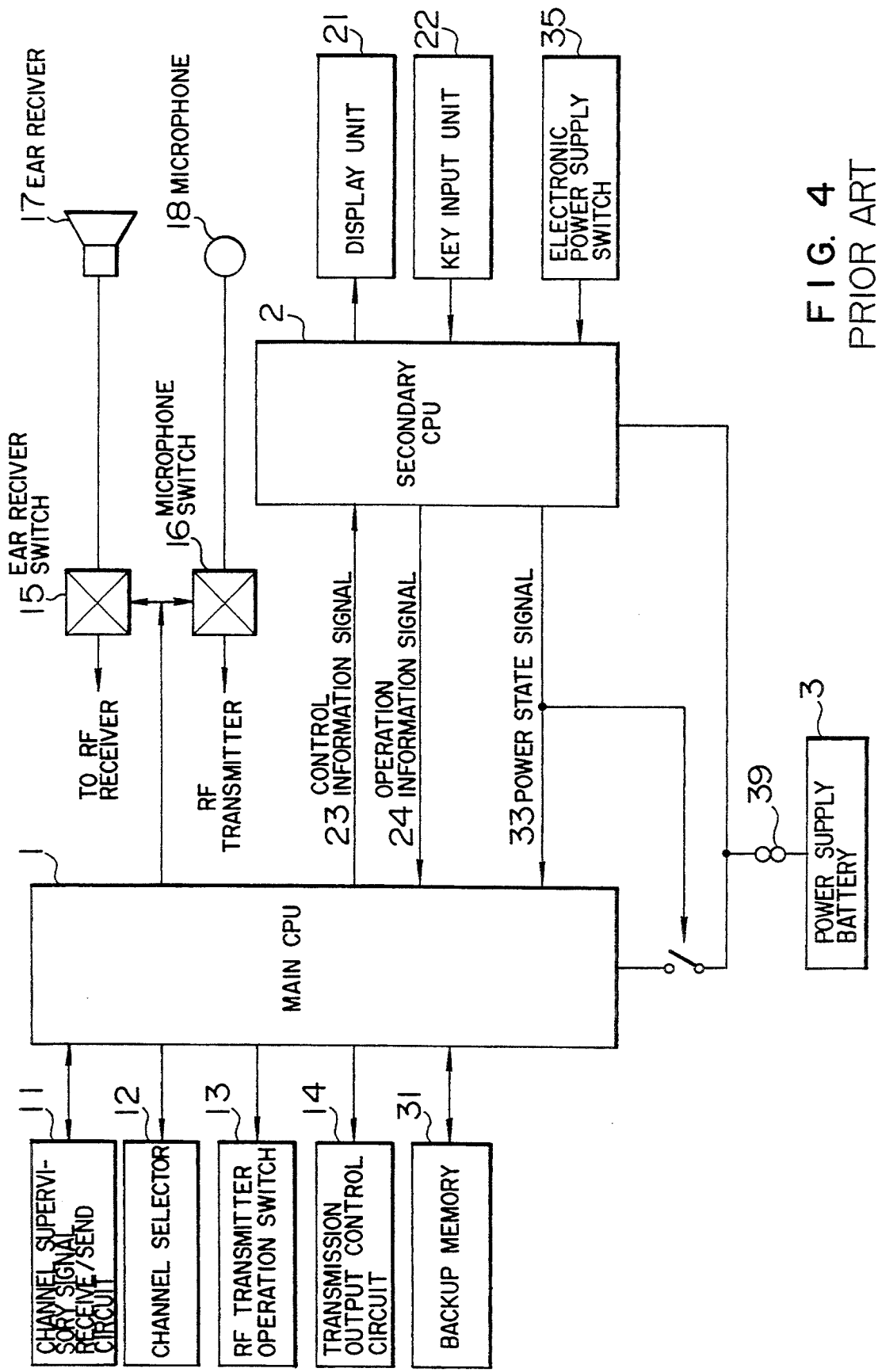
FIG. 4 is a block diagram of a prior art cellular telephone mobile station.
Figure 5:
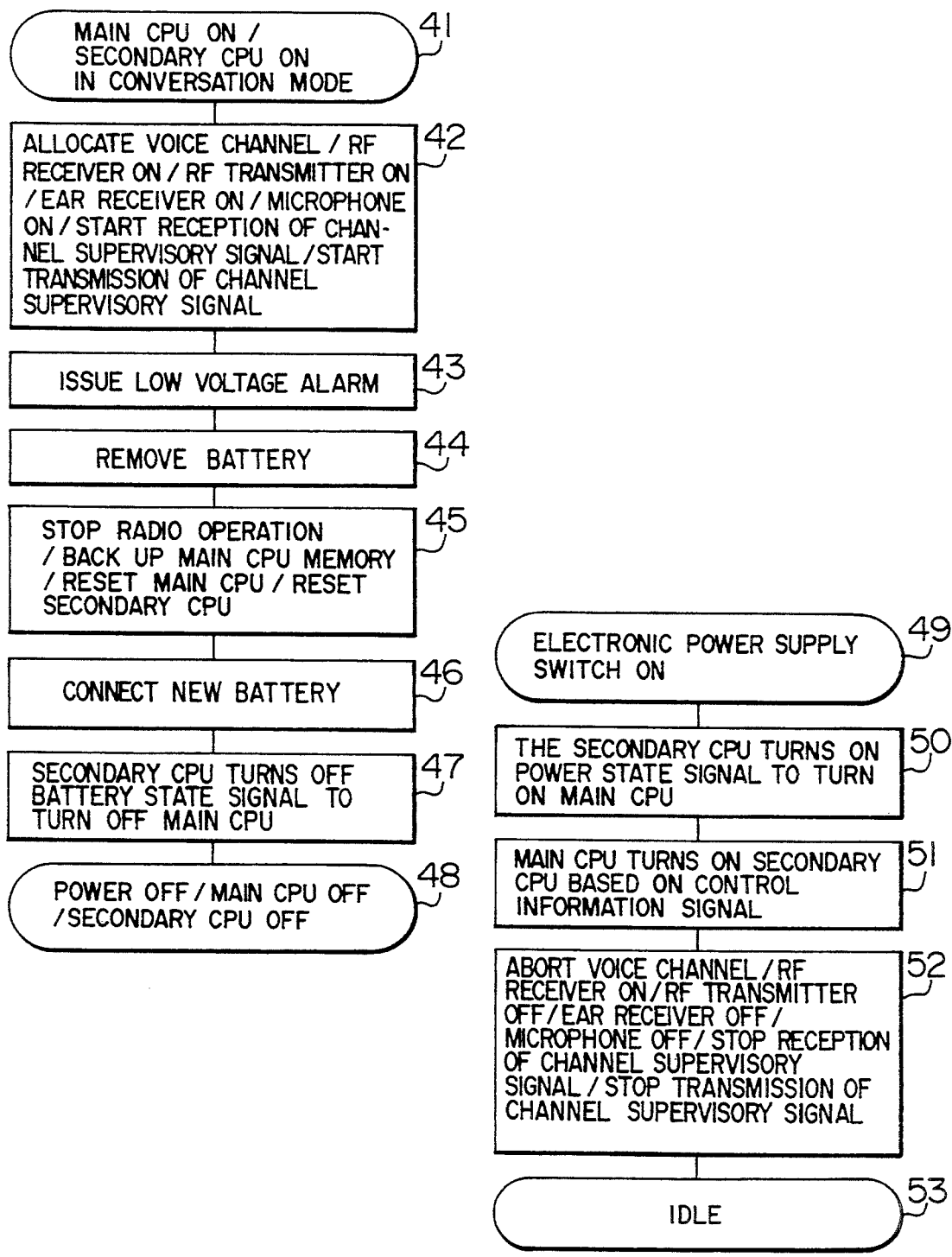
FIG. 5 is a flowchart for explaining the operation of the cellular telephone mobile station of FIG. 4.

An embodiment of the present invention will be explained by referring to the accompanying drawings. FIG. 1 is a block diagram of an embodiment of a cellular telephone mobile station based on a radio-link continuity keeping equipment of the present invention, FIG. 2 is a block diagram of a cellular telephone system including the cellular telephone mobile station of FIG. 1, and FIG. 3 is a flowchart for explaining the operation of the cellular telephone mobile station of FIG. 1. In FIG. 1, the same constituent parts as those of FIG. 4 are denoted by the same reference numerals.

The cellular telephone mobile station of FIG. 1 includes a main CPU 1a for performing control over the entire mobile station, and a channel supervisory signal receive/send circuit 11 for receiving and transmitting a channel supervisory signal on a voice channel to keep a radio-link to be explained later. The channel supervisory signal receive/send circuit 11 also informs the main CPU 1a of the reception of the channel supervisory signal and the transmission of the channel supervisory signal from the circuit 11 is controlled by the main CPU 1a.

The mobile station of FIG. 1 also includes a channel selector 12 for selecting any one of RF channels, an RF transmitter operation switch 13 for turning ON and OFF an RF transmitter 70 (refer to FIG. 2), a transmission output control circuit 14 for controlling a transmission output of the RF transmitter 70, an ear receiver switch 15 for turning ON and OFF a voice signal to be sent from an RF receiver 64 (refer to FIG. 2) to an ear receiver 17, and a microphone switch for turning ON and OFF a voice signal to be sent from a microphone 18 to the RF transmitter 70. The main CPU 1a controls the channel selector 12, RF transmitter operation switch 13, transmission output control circuit 14, ear receiver switch 15, microphone switch 16, RF receiver 64, RF transmitter 70 and so on.

Also included in the mobile station of FIG. 1 are a nonvolatile backup memory 31 for storing therein channel connection information and a power cut-off timer 32 for measuring a power-off time during which power is not supplied from a removable power supply battery 3 to the main CPU 1a. The channel connection information stored in the backup memory 31 and the measured time of the power cut-off timer 32 are read out by the main CPU 1a.

A secondary CPU 2a functions to control a display unit 21, a key input unit 22, an electronic power supply switch 35 and so on under control of the main CPU 1a. More specifically, the main and secondary CPUs 1a and 2a transfer therebetween a control information signal 23, an operation information signal 24, a power supply switch signal 34, and power state signal 33 to control call origination and reception, conversation, on-hook (end of conversation), keeping operation of a radio-link at the time of exchanging the power supply battery 3 in a conversation mode which will be explained later.

The main CPU 1a has a nonvolatile memory which functions to set and reset a power supply flag when the electronic power supply switch 35 is in its ON and OFF state respectively. The power supply battery 3 supplies power through battery contacts 39 to the main and secondary CPUs 1a and 2a, the RF receiver 64, RF transmitter 70 and so on. To the main CPU 1a and a logical inverter 38, power is supplied from the power supply battery 3 under the control of the power state signal 33 issued from the secondary CPU 2a. The logical inverter 38, when power supply thereto is stopped, starts the power cut-off timer 32.

In FIG. 2, the left side shows a base station, and the right side shows a schematic arrangement of the aforementioned mobile station.

The base station includes a base station controller 54 for establishing channel connection between a telephone subscriber 53 connected to an telephone exchanger 55 and the mobile station, a channel supervisory signal sender 56 for sending a supervisory signal on a voice-channel to the mobile station, and an RF transmitter 57 for converting the supervisory signal and the voice signal of the telephone subscriber 53 into a radio frequency signal and transmitting the radio frequency signal to the mobile station.

The base station also includes an RF receiver 60 for performing frequency conversion over a signal received through an antenna 59 from the mobile station, a channel supervisory signal receiver 61 for receiving a supervisory signal on a voice channel from the RF receiver 60, and a timer 62 for measuring a time during which the channel supervisory signal receiver 61 receives no supervisory signal from the RF receiver 60.

The mobile station includes, on the other hand, an antenna 63 for receiving radio waves from the antenna 58 of the base station and sending the waves to the RF receiver 64, a channel supervisory signal receiver 11a for receiving the supervisory signal of the radio-link from the RF receiver 64, a timer 65 for measuring a time during which the channel supervisory signal receiver 11a receives no supervisory signal, a channel supervisory signal sender 11b for sending the supervisory signal of the radio-link to the RF transmitter 70, and the RF transmitter 70 for transmitting a voice signal received from a microphone 18 as well as the supervisory signal received from the channel supervisory signal sender 11b, through an antenna 71 to the base station.

A controller 72, which controls the RF receiver 64 and the RF transmitter 70, comprises such main and secondary CPUs 1a and 2a as shown in FIG. 1.

With such an arrangement as mentioned above, the base station transmits the channel supervisory signal on a voice channel to the mobile station through the channel supervisory signal sender 56, RF transmitter 57 and antenna 58. The mobile station, when receiving the channel supervisory signal through the antenna 63, RF receiver 64 and channel supervisory signal receiver 11a, transmits the channel supervisory signal synchronized therewith to the base station through the channel supervisory signal sender 11b, RF transmitter 70 and antenna 71; whereas, when the mobile station fails to receive the channel supervisory signal, for example, for 5 seconds or more, the timer 65 cuts off the channel now being used for the conversation.

The base station receives the channel supervisory signal from the mobile station through the antenna 59, RF receiver 60 and channel supervisory signal receiver 61 and measures a distance from the mobile station. If the timer fails to receive the channel supervisory signal from the mobile station, for example, for 5 seconds or more, then the timer 62 cuts off the channel now being used for the conversation.

Explanation will next be made as to the operation of the foregoing embodiment.

In FIG. 1, when the power supply battery 3 is first set in an initial mode, the secondary CPU 2a turns ON and OFF the power state signal 33 and the power supply switch signal 34 to be sent to the main CPU 1a respectively, whereby the secondary CPU 2a get ready for an input from the electronic power supply switch 35.

The main CPU 1a, which is activated with power supplied from the power supply battery 3 under the control of the turned-ON power state signal 33, judges, on the basis of the turned-OFF power supply switch signal 34 received from the secondary CPU 2a, that the secondary CPU 2a is ready for an input from the electronic power supply switch 35. In addition, since a power supply flag is not set in the initial mode, the main CPU 1a judges that the power supply is in its OFF state and issues the control information signal 23 to the secondary CPU 2a to instruct the CPU 2a to turn OFF the power state signal 33. Accordingly, the supply of power from the power supply battery 3 to the main CPU 1a is stopped and the circuits to be controlled by the main CPU 1a are put in their OFF state.

Next, when the electronic power supply switch 35 is turned ON, the secondary CPU 2a turns ON both of the power state signal 33 and the power supply switch signal 34 to the main CPU 1a to start the main CPU 1a.

The main CPU 1a recognizes, on the basis of the turned-ON power supply switch signal 34 received from the secondary CPU, that the electronic power supply switch 35 is in its ON state and sends the control information signal 23 to the secondary CPU 2a to activate the secondary CPU. After recognizing the completion of activation of the secondary CPU 2a, the main CPU 1a turns ON the power supply flag. Accordingly, the cellular telephone mobile station is put in its idle mode so that, when originating a call or receiving a call, the telephone can be put in its conversation mode.

Explanation will next be made as to the radio-link keeping operation at the time of exchanging the power supply battery 3 during the telephone conversation with reference to FIG. 3.

In the conversation mode, the main and secondary CPUs 1a and 2a are both in their operative state (step 141) so that the main CPU 1a, when receiving the channel information, operates the RF receiver 64, RF transmitter 70, channel supervisory signal receive/send circuit 11, channel selector 12, RF-transmitter operation switch 13, transmission output control circuit 14, ear receiver switch 15 and microphone switch 16 (step 142), as already explained above.

At this stage, when the base station and the mobile station both transmit and receive the channel supervisory signals as shown in FIG. 2, timers 62 and 65 do not perform their counting operation and thus the voice channel is maintained.

In the conversation mode, if the power supply battery 3 is exhausted, a low voltage alarm is issued (step 143) and the power supply battery 3 is removed for its exchange (step 144), then the main CPU 1a stops its operation with the channel information stored in the backup memory 31 while the secondary CPU 2a similarly stops its operation (step 145) and the power cut-off timer 32 starts its counting operation (step 146).

In this case, since the base station can not receive the channel supervisory signals as shown in FIG. 2, the timer 62 starts its counting operation. And when the base station fails to receive the channel supervisory signal, e.g., for 5 seconds or more, the channel being used for the conversation is cut off.

When the old power supply battery 3 is replaced by a new one (step 147), the secondary CPU 2a turns ON and OFF the power state signal 33 and the power supply switch signal 34 to the main CPU 1a respectively and the secondary CPU gets ready for an input from the electronic power supply switch 35 (step 148), as in the above initial mode.

The main CPU 1a, which is supplied with power from the power supply battery 3 under the control of the turned-ON power state signal 33 and is activated, stops the counting operation of the power cut-off timer 32 and measures a power off time (step 149).

Subsequently, the main CPU 1a judges the previous state of the mobile station on the basis of the channel information stored in the backup memory 31 (step 150). When the channel information is not stored in the backup memory 31, the main CPU 1a issues the control information signal 23 to the secondary CPU 2a to stop the operation of the secondary CPU (step 151) and also stops its own power supply to stop the operation (step 152).

On the other hand, when the channel information is stored in the backup memory 31, the main CPU 1a issues the control information signal 23 to the secondary CPU 2a to activate the secondary CPU and then compares the power off time counted by the power cut-off timer 32 with the allowable time (=5 seconds) during which the base station receives no channel supervisory signal from the mobile station (step 154).

When the power off time is shorter than the allowable time, the main CPU 1a operates the RF receiver 64, RF transmitter 70, channel supervisory signal receive/send circuit 11, channel selector 12, RF-transmitter operation switch 13, transmission output control circuit 14, ear-receiver switch 15 and microphone switch 16 to restore the voice channel on the basis of the channel information stored in the backup memory 31 (step 155)

and return the mobile station to the conversation mode (step 156).

When the power off time is longer than the allowable time, the main CPU 1a turns ON only the RF receiver 64 and turns OFF the other RF transmitter 70, channel supervisory signal receive/send circuit 11, channel selector 12, RF transmitter operation switch 13, transmission output control circuit 14, ear receiver switch 15 and microphone switch 16, whereby the then voice channel is aborted (step 157) and the mobile station is put in the idle mode (step 158).

As has been disclosed in the foregoing, in accordance with the foregoing embodiment, in the case where it is desired to exchange the battery during the telephone conversation, if the user removes the old power supply battery 3 and sets a new one in the predetermined time, then the channel can be automatically restored and the need for turning ON the electronic power supply switch 35 in the prior art can be eliminated.

What is claimed is:

1. A radio-link continuity keeping equipment in a telephone mobile station which is capable of communicating with any of a plurality of telephone subscribers through a telephone base station and which is powered via an electrical contact that receives electric power from a first removable battery or from a new removable battery, said equipment comprising:

a backup memory for storing therein information on a channel connection through which the telephone mobile station has communicated with one of the telephone subscribers before said first removable battery is disconnected from said contact during a conversation mode;

a timer for measuring an elapsed time after the first removable battery is disconnected from said contact during the conversation mode until said new removable battery is connected to said contact;

a secondary CPU normally energized via said contact and for generating a first control signal at least when the new removable battery is connected to said contact;

electronic means, connected to the secondary CPU, for causing, when the electronic means is actuated, the secondary CPU to generate said first control signal and a second control signal;

a main CPU connected to said secondary CPU to receive said first control signal and said second control signal; and means for energizing the main CPU via the contact in response to the first control signal generated by the secondary CPU;

said main CPU being operative, in response to said first control signal, for judging whether or not said elapsed time measured by said timer is within a predetermined time and for restoring the channel connection when the elapsed time is within said predetermined time on the basis of the information stored in the backup memory and for generating a control information signal, which stops the secondary CPU from generating the first control signal, thus ending a supply of power from said contact to said main CPU, when the secondary CPU does not generate the second control signal and the main CPU finds no information stored in the backup memory.

2. An equipment of claim 1, wherein said predetermined time is 5 seconds.

3. A radio-link continuity keeping system including at least one telephone base station and at least one telephone mobile station which is capable of communicating with any of a plurality of telephone subscribers through the telephone base station, wherein the telephone mobile station comprises:

an electrical contact for receiving electric power from a first removable battery or from a new removable battery and for powering said telephone mobile station with said electric power;

a backup memory for storing therein information on a channel connection through which the telephone mobile station has communicated with one of the telephone subscribers before said removable battery is disconnected from said contact during a conversation mode;

a timer for measuring an elapsed time after the first removable battery is disconnected from said contact during the conversation mode until said new removable battery is connected to said contact;

a secondary CPU normally energized via said contact and for generating a first control signal at least when the new removable battery is connected to said contact;

electronic means, connected to the secondary CPU, for causing, when the electronic means is actuated, the secondary CPU to generate said first control signal and a second control signal;

a main CPU connected to said secondary CPU to receive said first control signal and said second control signal; and means for energizing the main CPU via the contact in response to the first control signal generated by the secondary CPU;

said main CPU being operative, in response to said first control signal, for judging whether or not said elapsed time measured by said timer is within a predetermined time and for restoring the channel connection when the elapsed time is within said predetermined time on the basis of the information stored in the backup memory and for generating a control information signal, which stops the secondary CPU from generating the first control signal, thus ending a supply of power from said contact to said main CPU, when the secondary CPU does not generate the second control signal and the main CPU finds no information stored in the backup memory;

and, wherein the telephone mobile station and the telephone base station mutually transmit and receive a supervisory signal through the channel connection, and wherein the base station cuts off the channel connection when the telephone base station receives no channel supervisory signal from the mobile station for the predetermined time.

4. An equipment of claim 3, wherein said predetermined time is 5 seconds.

* * * * *